United States Patent [19]

Martorano et al.

[11] Patent Number: 5,653,412
[45] Date of Patent: Aug. 5, 1997

[54] TRACK MOUNTING CLIP FOR A TRACK LIGHTING SYSTEM

[75] Inventors: Sam Martorano, Des Plaines; James Vafai, Barrington, both of Ill.

[73] Assignee: Cooper Industries, Inc., Houston, Tex.

[21] Appl. No.: 339,671

[22] Filed: Nov. 14, 1994

[51] Int. Cl.[6] .................................................. F21S 1/04
[52] U.S. Cl. .................. 248/222.11; 248/320; 248/343; 362/404; 362/418
[58] Field of Search ................... 248/300, 222.12, 248/320, 343, 262, 309.1, 222.11; 160/178.1 R, 902; 362/147, 404, 418

[56] References Cited

U.S. PATENT DOCUMENTS

| | | | |
|---|---|---|---|
| 2,711,876 | 6/1955 | Goebel | 248/343 |
| 2,736,528 | 2/1956 | LeBrock | 362/404 X |
| 3,190,604 | 6/1965 | Jorgensen et al. | 248/343 X |
| 3,246,074 | 4/1966 | Neumann et al. | 248/343 X |
| 3,346,909 | 10/1967 | Blackburn | 248/343 X |
| 3,574,964 | 4/1971 | Ownbey. | |
| 3,589,660 | 6/1971 | Dunckel | 248/343 |
| 3,683,312 | 8/1972 | Routh et al. | 248/343 X |
| 3,719,818 | 3/1973 | Porter et al. | 248/343 X |
| 4,976,633 | 12/1990 | Beghelli. | |
| 4,980,808 | 12/1990 | Lilos. | |
| 5,335,890 | 8/1994 | Pryor et al. | 248/343 |

*Primary Examiner*—Derek J. Berger
*Attorney, Agent, or Firm*—Burns, Doane, Swecker & Mathis, L.L.P.

[57] ABSTRACT

A track lighting system includes a track snap-on clip attached to a ceiling and forming a downwardly open channel into which a track member can be inserted by a snap action. The clip includes spring arms formed in opposite legs of the channel. When the track is pushed up into the channel, the spring arms are elastically displaced outwardly. When lateral shoulders of the track travel past respective spring arms, the spring arms snap inwardly to underlie the shoulders and support the track. The track snap-on clip can be mounted to the ceiling either directly by means of a fastener, or indirectly by means of another member, such as a T-bar clip or a pendant bracket.

6 Claims, 2 Drawing Sheets

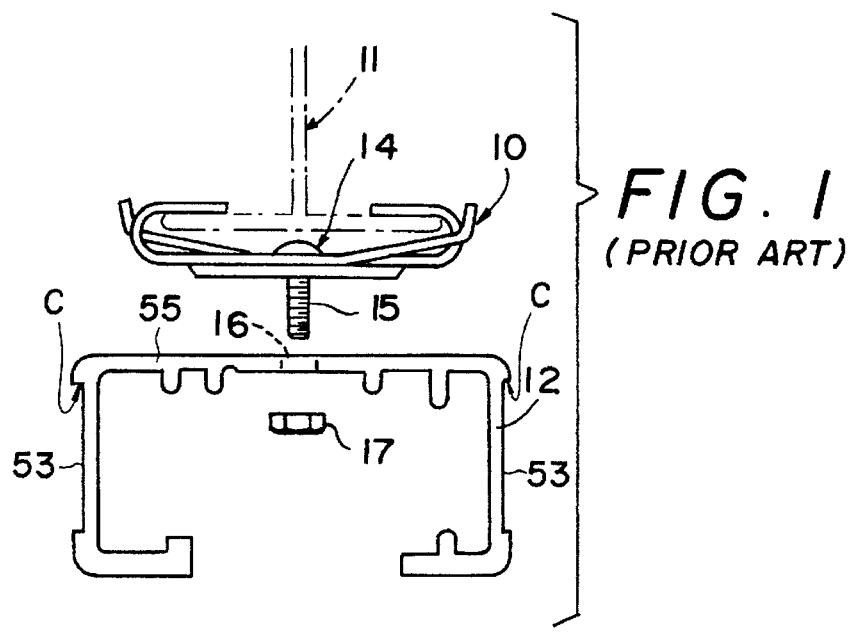
FIG. 1 (PRIOR ART)
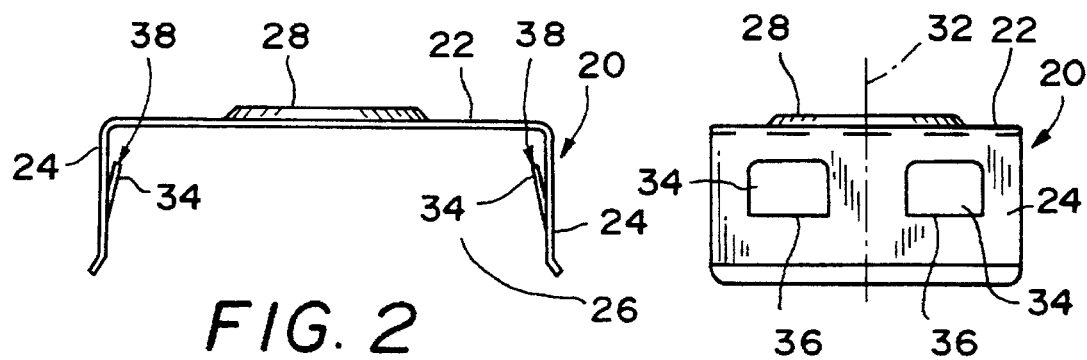
FIG. 2
FIG. 3
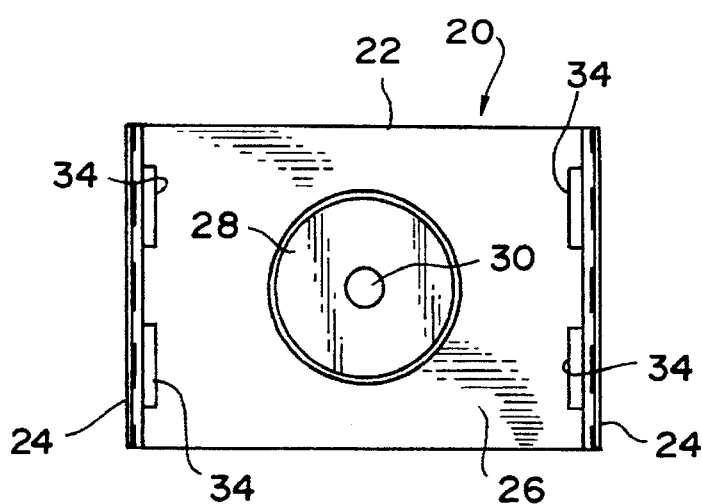
FIG. 4

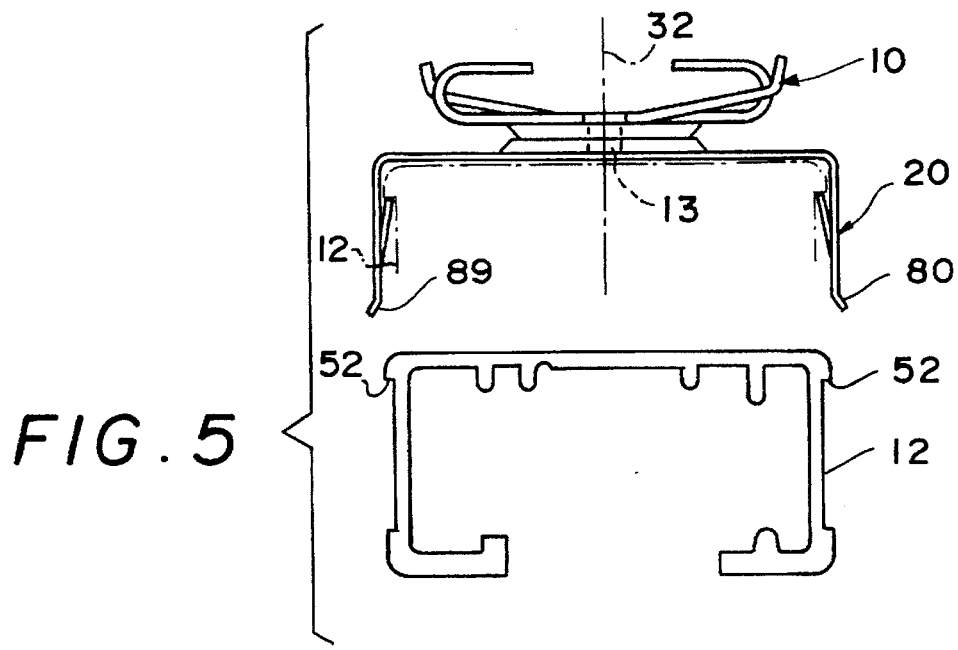
FIG. 5
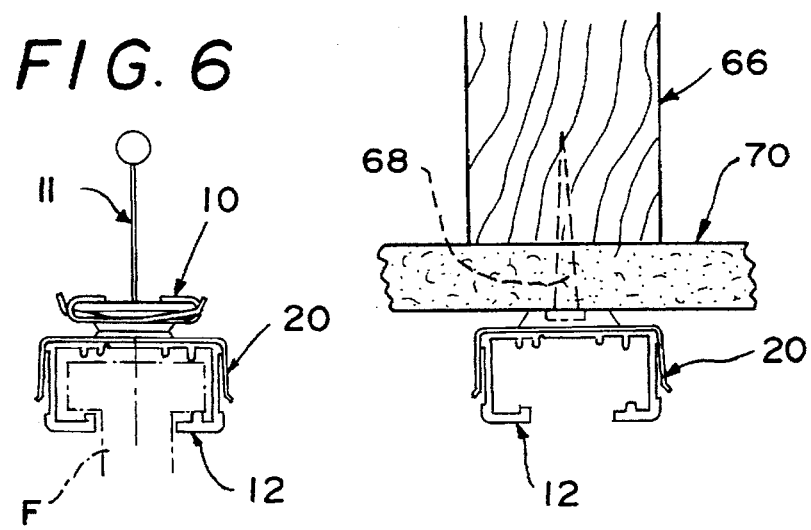
FIG. 6
FIG. 7
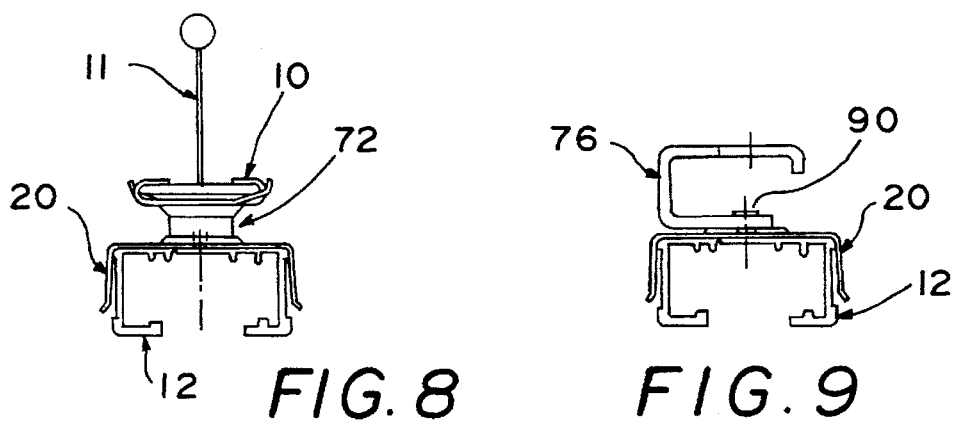
FIG. 8  FIG. 9

5,653,412

TRACK MOUNTING CLIP FOR A TRACK LIGHTING SYSTEM

BACKGROUND OF THE INVENTION

The present invention relates to track lighting and, in particular, to the mounting of track to a support structure, such as a ceiling or vertical wall, the track configured to receive a light fixture.

It is conventional to mount the track of a track lighting assembly to a support structure, such as a ceiling, by means of conventional T-bar clips 10 of the type depicted in FIG. 1. An installer mounts those clips 10 to a conventional T-bar 11 of the ceiling structure. The T-bar clip 10 carries a carriage bolt 14, the threaded stem 15 of which projects downwardly. The track 12 must be provided with holes 16 to receive the threaded stems of the clips. 10. Then, the installer attaches the track 12 to the T-bar clips so that the stems 15 project through the holes 16, and so that nuts 17 can be secured to the stems 15. The track can be oriented as desired relative to the T-bar 11, i.e., parallel or perpendicular to the T-bar 11 or at any desired angle in between.

It will be appreciated that the installation of the track in that manner requires that holes be drilled in the track, and it is necessary for the installer to hold the track in place while inserting the nuts. In cases where the track is relatively long, that can be somewhat awkward.

It would be desirable to enable the track of a track lighting system to be installed more quickly and easily than has been heretofore the case, and without the need to drill holes in the track.

SUMMARY OF THE INVENTION

The present invention relates to a track snap-on clip attachable to a support structure, especially a ceiling, for supporting a light fixture. The clip comprises a generally U-shaped member formed of a base and a pair of legs projecting from the base to form a channel therebetween. Each leg includes at least one projection projecting into the channel for enabling a track to be inserted with a snap-on action into the channel.

Preferably, each projection comprises a spring arm which is partially cut from a respective one of the legs, the spring arm being yieldable during insertion of the track into the channel.

The track snap-on clip may be connected directly to the ceiling, or indirectly by means of an additional member, such as a T-bar clip or a pendant bracket. The track snap-on clip would preferably be rotatable relative to the additional member about an axis extending through the base perpendicularly to the track-receiving channel.

The invention also relates to the combination of the track snap-on clip and the additional member as well as the combination of the track snap-on clip and the track.

BRIEF DESCRIPTION OF THE DRAWINGS

The objects and advantages of the invention will become apparent from the following detailed description of preferred embodiments thereof in connection with the accompanying drawings in which like numerals designate like elements an in which:

FIG. 1 is an exploded view of a conventional T-bar clip which is connectable to a ceiling T-bar (shown in phantom lines) and a conventional track for receiving a light fixture;

FIG. 2 is a side elevational view of a track snap-on clip according to the present invention;

FIG. 3 is an end view of the track snap-on clip depicted in FIG. 2;

FIG. 4 is a bottom plan view of the track snap-on clip depicted in FIG. 2;

FIG. 5 is an exploded view of the track snap-on clip depicted in FIG. 2 connected to the prior art T-bar clip depicted in FIG. 1, and a conventional track, the track shown in phantom lines in a mounted position;

FIG. 6 is an end elevational view of a track snap-on clip according to the present invention in combination with a prior art T-bar clip, a ceiling T-bar, a prior art track, and a lighting fixture (shown in phantom lines);

FIG. 7 is an end elevational view of the track snap-on clip depicted in FIG. 2 mounted directly to a ceiling stud and carrying a prior art track;

FIG. 8 is a side elevational view similar to FIG. 6, with the addition of a spacer disposed between the T-bar clip and the track snap-on clip; and FIG. 9 is an end elevational view of the track snap-on clip depicted in FIG. 2, in combination with a prior art track and a prior art pendant clip.

DETAILED DESCRIPTION OF PREFERRED EMBODIMENTS OF THE INVENTION

Depicted in FIGS. 2–5 is a track snap-on clip 20 comprising a piece of sheet metal (e.g., spring steel) which is of generally U-shape defined by a base 22 and two integral legs 24 projecting outwardly therefrom. A channel 26 is defined between the legs 24. A central region of the base 22 is deformed in a direction away from the channel 26 to form a circular protrusion 28 having a central hole 30 therein which defines an axis 32.

Each of the legs 24 includes a pair of partial cut-outs 34 which are bent inwardly into the channel 26 about a bend edge 36 to define projections in the form of spring arms. The spring arms 34 are shown in a relaxed state in FIG. 2. Each of the spring arms includes an upper end 38 for supporting a track, as will become apparent.

The track snap-on clip 20 is to be used in conjunction with an attaching structure which is attachable to a support structure such as a ceiling or vertical wall. Such an attaching structure may comprise a T-bar clip 10 depicted in FIGS. 6 and 8, a screw 68 depicted in FIG. 7, or a pendant bracket 76 depicted in FIG. 9, among other possibilities.

In the case of attaching the track snap-on clip 20 to a T-bar clip 10, such attachment is performed at the factory by means of a fastener such as a rivet 13, for example. That is, the carriage bolt 14 depicted in FIG. 1 is eliminated. Therefore, the installer who installs the track to the ceiling need not insert any bolts, but rather merely inserts the T-bar clip 10 onto the T-bar 11 in the conventional manner, i.e. a pressing and turning maneuver. The conventional T-bar clip 10 may comprise a Halo® L-983 or L-984 T-bar clip. Generally speaking, the installer would use two clip units 10/20 for up to four feet of track, three clip units 10/20 for up to eight feet of track, and four clip units for up to twelve feet of track.

The track snap-on clip 20 is rotatable relative to the T-bar clip 10 about an axis defined by the fastener 13, which axis extends through the base 22 in a direction perpendicular to the channel 26 (i.e. a vertical axis 32 in the case of a unit 10/20 mounted to a ceiling).

The track 12 is of a conventional configuration which includes two ribs 52 extending longitudinally along the upper portions of the track sides. Those ribs define lateral shoulders which are taken advantage of by the present invention. i.e., the spring arms 34 of the clip 20 cooperate with those shoulders 52 to support the track.

Insertion of a track 12 into the track snap-on clip 20 is performed by merely pushing the track into the channel 26 such that the spring arms 34 are elastically deflected inwardly by the lateral shoulders 52. Eventually, the shoulders 52 travel past the spring arms 34, whereupon the spring-arms snap inwardly behind the shoulders to support the track and prevent its removal (e.g., see the phantom lines in FIG. 5).

Depicted in FIG. 7 is an alternative embodiment, wherein the track snap-on clip 20 is not used in conjunction with another clip, but rather is directly attached to a ceiling joist 66 by means of a fastener, e.g., a screw or nail 68, which extends through the center hole 30 of the clip 20. A ceiling panel 70 is depicted in FIG. 7 as disposed beneath the joist 66. Instead of a screw 68, an anchor bolt or toggle bolt could be used.

Depicted in FIG. 8 is the arrangement shown in FIG. 6 with the addition of a spacer 72 disposed between the clips 10 and 20. Such a clip unit would be used in connection with dropped tile or semi-recessed T-bar to compensate for the recess depth.

FIG. 9 depicts a further embodiment, wherein the track snap-on clip 20 is pivotably attached (e.g., by a rivet 90) to a conventional pendant bracket 76 which is to be attached to a conventional pendant arrangement (not shown). The attachment between the clip 20 and bracket 76 would be made at the factory.

The manner of installing a track lighting assembly to a ceiling utilizing the present invention will now be described. With reference to the embodiment described in connection with FIGS. 5 and 6, the clip units 10/20 depicted therein will have been previously factory-assembled. Thus, it is merely necessary for the installer to attach the desired number of the clip units 10/20 to the ceiling T-bar structure 11 in relationship to one another estimated for achieving a desired orientation of the track. This attachment is performed by securing the T-bar clips 10 directly to the T-bar(s) by the conventional pressing/twisting maneuver. Then, the track 12 can be installed by simply being pushed into the channels 26 of the track snap-on clip 20 to elastically displace the spring arms 34 thereof as described above. When the spring-arms snap back to a position beneath the shoulders 52, and into engagement with a respective corner C formed by the intersection of the shoulders 52 and opposite vertical surfaces 53 of the track, the track will be supported against dislodgement, and the top 55 of the track will be situated immediately adjacent the base 22 of each clip 20. The track can be easily oriented as desired while performing this operation, since the clip units 10/20 can be slid along their respective T-bars, and the track snap-on clip 20 can be rotated relative to the T-bar clip 10 about the vertical axis 32. Hence, the track can be arranged in any desired orientation, e.g., parallel or perpendicular to the T-bars or at any angle in between.

The actual insertion of the track into the channel 26 is facilitated by forming the lower ends 80 of the legs 20 as outwardly bent (divergent) parts to aid in guiding the track 50 into the channel 26.

As noted earlier, the track snap-on clip 20 can be used without the T-bar clip 10 by being directly connected to a ceiling joist 66 by means of screws 68 as depicted in FIG. 7.

Alternatively, the clip 20 can be used with other types of ceiling mounts, such as the conventional U-shaped pendant clip 76 of FIG. 9. The clip 20 is fastened to a lower leg of the pendant clip 76 by a rivet 90 which provides for rotation of the track snap-on clip 20 relative to the pendant clip.

Once the track 12 has been installed in the desired orientation, the lighting fixtures F (FIG. 6) can be installed into the track in the usual manner.

It will be appreciated that the present invention facilitates the mounting of track, because in the case of the embodiments of FIGS. 6, 8, and 9, the track snap-on clip 20 is already assembled to the additional member, i.e., the T-bar clip 10 or pendant bracket 76. Thus, it is not necessary for the installer to drill holes in the track, or insert nuts while holding the track in place. Rather, once the appropriate number of clip units 10/20 have been mounted to the T-bar(s) 11, the track is merely pushed into the channels 26. In the embodiment according to FIG. 7, there is no need to drill holes in the track, or attach nuts in order to install the track.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

We claim:

1. In combination, a track, an electrical light unit mounted in said track, and a plurality of snap-on clips attached to said track, said clips being spaced-apart along said track; each snap-on clip being mounted to a ceiling and supporting said track such that said track hangs below a plane of said ceiling; each of said clips comprising an inverted generally U-shaped member formed of a horizontal base and a pair of legs projecting downwardly from said base to form therebetween a channel in which said track is mounted; each leg including at least one spring arm projecting into said channel; said track including a pair of vertical surfaces facing respective ones of said legs, and a horizontal shoulder projecting from an upper end of each said surfaces to define a corner with said surface; each spring arm projecting upwardly into said channel and being elastically displaceable outwardly toward its respective leg by said track as said track is pushed upwardly therepast, an upper end of each spring arm springing into engagement with an underside of said shoulder as said shoulder travels upwardly past said upper end, each of said clips being mounted to said ceiling for rotation about a vertical axis to enable said channels to be aligned with one another for receiving said track.

2. The combination according to claim 1 wherein said track projects downwardly past lower ends of said legs.

3. The combination according to claim 2 wherein lower ends of said legs are bent away from each other, each leg being inclined relative to both the vertical and horizontal directions to guide said track upwardly into said channel.

4. The combination according to claim 1 wherein lower ends of said legs are bent away from each other, each leg being inclined relative to both the vertical and horizontal directions to guide said track upwardly into said channel.

5. The combination according to claim 4 wherein each of said spring arms includes a relaxed position situated sufficiently far into said channel to cause said upper end thereof to spring into engagement with a respective one of said corners when said shoulder travels upwardly past said upper end, and with a top of said track situated immediately adjacent said base of said track.

6. The combination according to claim 1, wherein each of said spring arms includes a relaxed position situated sufficiently far into said channel to cause said upper end thereof to spring into engagement with a respective one of said corners when said shoulder travels upwardly past said upper end, and with a top of said track situated immediately adjacent said base of said track.

* * * * *